Sept. 9, 1952  J. D. RUSSELL  2,610,271
THERMAL-MAGNETIC RELAY
Filed May 1, 1948  2 SHEETS—SHEET 1

Inventor:
John D. Russell.
by John F. Schmidt
Attorney.

Sept. 9, 1952          J. D. RUSSELL          2,610,271
THERMAL-MAGNETIC RELAY
Filed May 1, 1948          2 SHEETS—SHEET 2
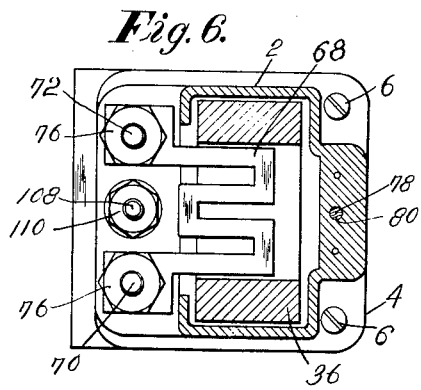
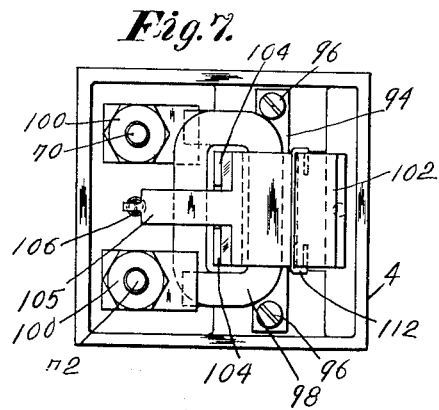
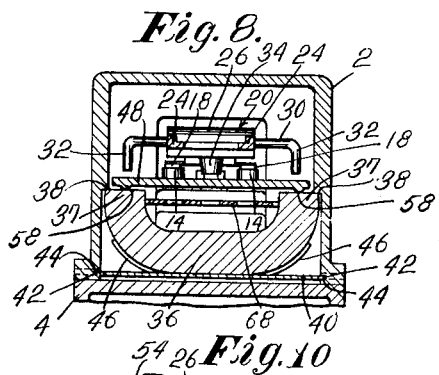
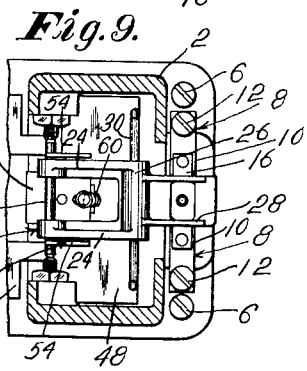
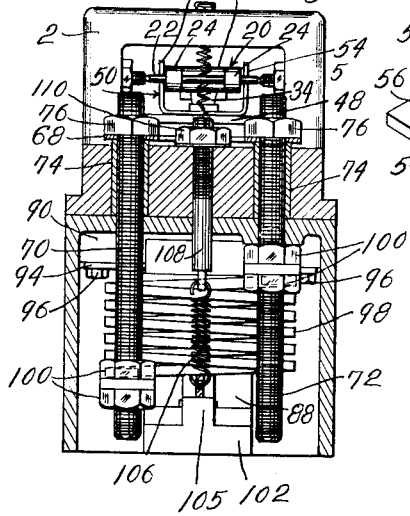
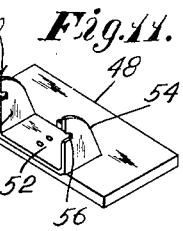
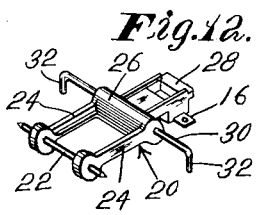
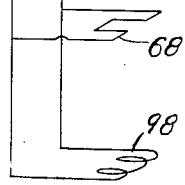
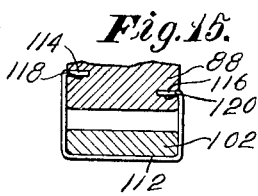
Inventor:
John D. Russell.
by John F. Schmidt
Attorney.

Patented Sept. 9, 1952

2,610,271

UNITED STATES PATENT OFFICE 2,610,271

THERMAL-MAGNETIC RELAY

John D. Russell, Franklin, Pa., assignor to Joy Manufacturing Company, Pittsburgh, Pa., a corporation of Pennsylvania Application May 1, 1948, Serial No. 24,623

14 Claims. (Cl. 200—88)

This invention relates to a relay, especially to an overload relay such as is used to protect an electric motor against overheating due to overloading.

In order to avoid failure of the insulation in electric motors, they have to be protected against overloading. Practically all electric motors are capable of withstanding some overloading. A motor can carry a heavier load than it is designed for, for a short period of time, because the increased heat is dissipated upon return to normal loading before the temperature can rise enough to cause any damage. It is, however, necessary to guard against even small overloads sustained over long periods of time, because the heating effect is cumulative and builds the temperature up high enough to cause failure of the insulation. In addition to small overloads sustained over long periods of time, it is also necessary to protect a motor against very high instantaneous overloads, because the latter might cause flash-overs and result in serious injury to the equipment. It is, therefore, desirable to have a simple and rugged overload relay which will serve to protect the motor against small but sustained overloads, and against very large instantaneous overloads. It is, however, desirable that such a device not disconnect the motor from the power source for small overloads of short time duration.

It is an object of this invention to provide an overload relay of simple and rugged design. It is another object of this invention to provide an overload relay which will permit small overloads of short time duration. It is still another object of this invention to provide an overload relay which gives protection against instantaneous overloads of great magnitude. It is yet another object of this invention to provide an overload relay which gives protection against small overloads of long time duration, and also against instantaneous overloads of large magnitude while at the same time permitting small overloads of short time duration.

These and other objects are accomplished in a relay which is arranged to interrupt a pilot or control circuit of an electric motor upon the occurrence of a small overload sustained over a long period of time, or an instantaneous overload of large magnitude. The small but sustained overload interrupts the pilot circuit by heating up an alloy which is magnetizable at room temperatures, but which becomes non-magnetic at somewhat elevated temperatures and which is positioned to hold the pilot circuit closed as long as it is magnetic. Interruption of the pilot circuit by a large magnitude of instantaneous overloads is provided for by an electromagnetic means for interrupting a pilot circuit which is independent of the temperature responsive means. The heater and the electromagnetic coil are placed in series with the circuit which is to be protected against overload. In many applications, the circuit to be protected will be the armature of an electric motor.

In the drawings:

Fig. 6 is a transverse section on the planes of line 6—6 of Fig. 4.

Fig. 7 is a view looking up at the bottom of Fig. 4.

Fig. 8 is a partial vertical section on the planes of line 8—8 of Fig. 4.

Fig. 9 is a transverse section on the plane of line 9—9 of Fig. 4.

Fig. 10 is a partial vertical section on the plane of line 10—10 of Fig. 1.

Fig. 11 is a detailed perspective view of the member which loses its magnetic properties at elevated temperatures.

Fig. 12 is a detailed perspective view of the circuit closing element and its mounting means.

Fig. 13 is an elementary circuit diagram of the heater element and the coil of the electromagnet.

Fig. 15 is a view in section on the plane of line 15—15 of Fig. 4.

Figure 1:
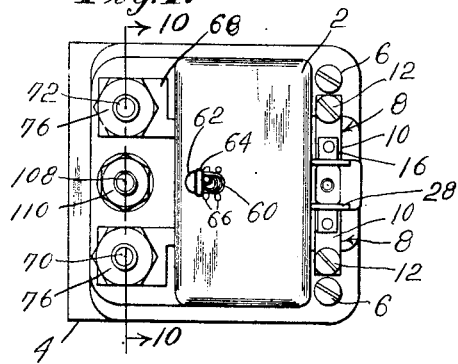
Fig. 1 is a top plan view of a relay made according to the invention. The designation "top plan" refers to the orientation of the device as shown in the drawings, but it will be understood that the device may be used in any of a number of different positions.
Figure 2:
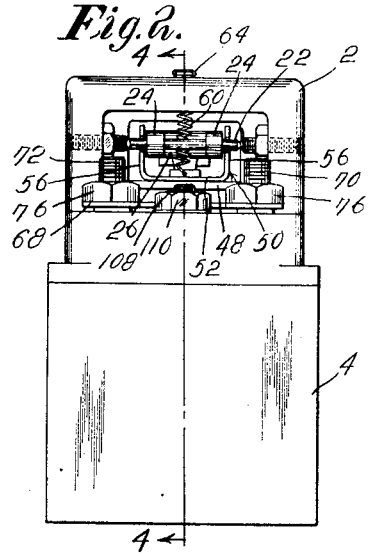
Fig. 2 is a view in elevation of the left-hand face of the device shown in Fig. 1.
Figure 3:
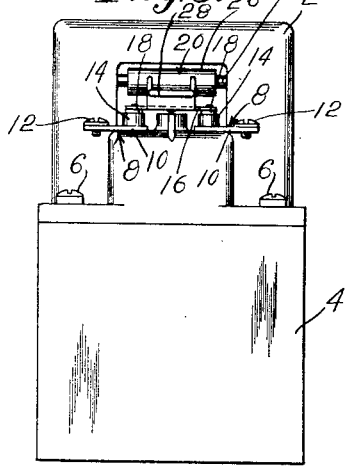
Fig. 3 is a view in elevation of the right-hand face of the device shown in Fig. 1.

Referring now to the drawings in greater detail, the embodiment shown therein is mounted in a two-part casing consisting of an upper casing 2 and a lower casing 4 fastened together by any suitable means, such as screws 6. Two terminals, indicated generally at 8, are mounted on the outside of the upper casing 2. Each terminal 8 consists of a connector strap 10, a conductor screw 12, and a contact 14. A circuit is established between the two terminals by bridging the contacts 14. To accomplish this, a bridge member 16, made of any suitable electrical conductor, is provided with contacts 18 to engage the contacts 14. The bridge member is movably carried by mounting means which permit movement of the bridge member into and out of contact with the terminals 8 to make and break, respectively, a circuit between the two terminals. The mounting member is shown in detail in Fig. 12, and is indicated generally by the reference numeral 20. Mounting member 20 consists of a pivotally mounted shaft 22 on which are disposed parallel arms 24. The arms 24 are joined together by a transverse member 26 to which is secured an extension 28. The bridge member is mounted immediately on the extension 28. It will be understood by those skilled in the art that the arms 24, transverse member 26, and extension 28 are made of any suitable insulating material. Extending through the transverse member 26 there is an actuator 30 for the mounting member of any suitable magnetizable material. The mounting member actuator 30 has at each outer extremity a downwardly turned extension 32. At the underside of the transverse member 26, there is provided a boss 34. As is best seen in Fig. 8, the boss 34 extends downward slightly further than the downward extensions 32.

There is provided in the upper casing 2 a permanent magnet 36, being shaped like a shallow U and having poles 37. The outer edges of the legs of the U cooperate with shoulders 38 formed on the inside of upper casing 2 to locate the magnet. A retaining member 40, preferably of a somewhat resilient material, is held in place in the upper casing 2 by means of prongs 42 cooperating with openings 44 in the casing. The retaining member 40 is preferably slotted at its ends, in order that portions thereof at its ends may be curved to form fingers 46 having substantially the same contour as the magnet 36. Thus the magnet 36 is securely held in place by the shoulders 38 and retaining member 40. Adjacent the permanent magnet 36, and in fact normally in contact with the faces of poles 37, there is provided an intermediate member 48. Intermediate member 48 is secured to a bracket 50 which is mounted so as to pivot about the shaft 22. As is best seen in Fig. 11, the bracket 50 is a U-shaped piece, the cross member 52 being secured to the intermediate member 48 by any suitable means, and the legs 54 of the U being provided with notches or recesses 56 which cooperate with the shaft 22 to make the bracket 50 pivotal on this shaft, as aforesaid. The intermediate member 48 is preferably provided with small pimplelike projections 58 which contact the pole faces. The intermediate member 48 is constructed of a material which is magnetizable at room temperatures, but which becomes non-magnetic at higher temperatures. The choice of the material will depend on a number of factors, but this material may, if desired, be Monel metal which becomes non-magnetic in the range between 80° F. and 203° F., or it may be Invar which becomes non-magnetic in the range from 324° F. to 520° F. Invar has been successfully used in one embodiment of the invention, but it will be understood by those skilled in the art that Monel metal can also be used for this purpose.

Figure 4:
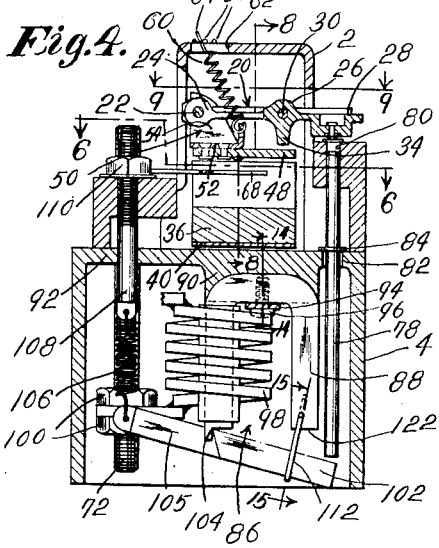
Fig. 4 is a vertical sectional view on the plane of line 4—4 of Fig. 2.
Figure 14:
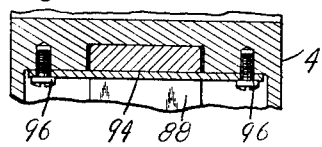
Fig. 14 is a detailed view in section on the plane of line 14—14 of Fig. 4.

A spring 60 is connected to the bracket 50, and extends upward through an opening 62 in upper casing 2. A loop 64 which is wider than the opening 62 may be provided at the end of spring 60, in order to hold the spring end against being pulled through the hole. As is best seen in Fig. 4, spring 60 extends upward at an angle. The outside of upper casing 2 adjacent the hole 62 is provided with a plurality of spaced projections 66, in order to permit variation of the position of the loop 64 and thereby permit variation of the tension in spring 60.

In order to provide for an increase in the temperature of intermediate member 48, a heater element 68 is provided in the vicinity of the member 48. As here shown, the heater 68 is disposed immediately below the member 48 and is located between the poles of the permanent magnet 36. The heater element 68 is connected in series with the circuit which is to be protected against overloading, as, for example, the armature of an electric motor. The circuit diagram for a portion of such a connection is shown in Fig. 13.

In the embodiment of the invention shown in the drawings, two studs 70 and 72 are shown threaded into bushings 74 in the upper casing 2. The upper ends of the bushings 74 provide shoulders against which the ends of the heater element abut, being clamped between the upper ends of the bushings and nuts 76 which are threaded onto the studs 70 and 72.

In addition to the spring means, comprising the spring 60, bracket 50, intermediate member 48 and the bridge mounting means, for moving the bridge member into circuit breaking position, there is provided a bridge actuator which is independent of the spring means. In the embodiment shown, the bridge actuator is a movable member 78, herein shown as a rod vertically reciprocable in a bore 80 in the upper casing 2 and extending through a bore 82 in the lower casing 4. A collar 84 is provided on the bridge actuator 78 to limit its downward movement. The bore 80 is preferably of such a size relative to the bridge actuator as will provide a sliding fit so as to serve as guide means for the bridge actuator. The bore 82 is preferably considerably larger than the bridge actuator and offers no resistance to its movement.

Electromagnetic means, indicated generally at 86, are provided to move the bridge actuator in response to a momentary overload of considerable magnitude in the circuit to be protected. The electromagnetic means will now be described in detail. An inverted U-shaped member 88 is secured to a boss 90 provided on wall 92 of the lower casing 4. Member 88 may be secured by any suitable means, as, for example, by a bar or strap 94 held in place by screws 96. A coil 98 is helically wrapped around one leg of the U-shaped member 88. The coil 98 is connected in parallel with heater element 68, and is thus in series with the circuit that is to be protected against overload. In the embodiment of the invention shown in the drawings, one end of coil 98 is electrically connected to the stud 70 by being clamped between nuts 100, and the other end is electrically connected to the stud 72 by being clamped between a similar pair of nuts 100. As will be understood by one skilled in the art, the circuit to be protected may be electrically connected to the studs 70 and 72 by any suitable means, which need not be detailed here.

An armature 102 is mounted so as to be movable in response to a predetermined current flow in the coil 98, and is positioned to impart its movement to reciprocation of the bridge actuator 78 against the bridge to move the latter into circuit breaking position. The armature 102 is here shown as being pivotable about knife edges bearing on the end of one leg of the U-shaped member 88. As here shown the knife edges 104 on armature 102 cooperate with bearing surfaces on the end of the leg about which the coil 98 is wound. The fulcrum about which armature 102 pivots is thus somewhere between its ends, one of these ends being movable to operate the bridge actuator and the other end 105 having somewhat reduced dimensions and being connected to one end of a spring 106; the other end of the spring is anchored to a stud 108 which is threaded at its upper end. A nut 110 engages the threaded end of stud 108 and permits adjustment of the tension of spring 106 (see especially Fig. 10).

Figure 5:
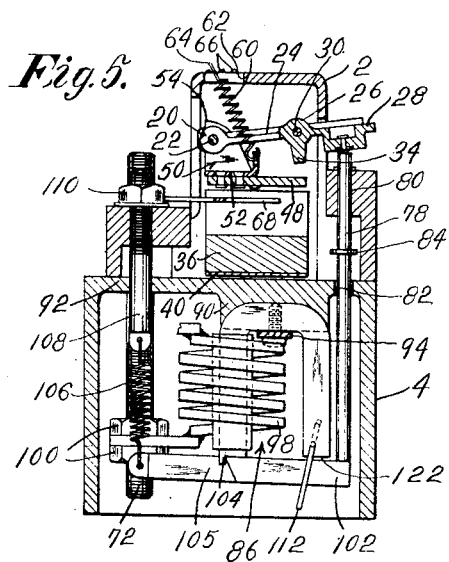
Fig. 5 is a view similar to Fig. 4 but showing the parts in different operating positions.

A retaining loop 112 is provided in the right-hand leg, as seen in Figs. 4, 5 and 7, of the U-shaped member 88. As is best seen in Fig. 15, the loop 112 has inwardly turned ends 114 and 116 which cooperate with offset bores 118 and 120, respectively, in the U-shaped member 88. The bores 118 and 120, and therefore the inwardly turned ends 114 and 116, are not aligned axially but are deliberately offset, in order that the loop 112 will not swing freely but will remain stationary relative to the member 88 and will thus always hold the armature 102 a fixed distance from the pole face 122 when the armature is in its dropped-out position, as shown in Fig. 4.

*Operation*

In the operation of an overload relay made according to the invention, it will be assumed for the purpose of illustration that the device is used in an electric motor. The terminals 8 are connected in series with the pilot or control circuit of a motor starter and the studs 70 and 72 are connected in series with the armature. For all normal loading of the motor, there is of course no interruption of operation. During such normal operation, the close proximity of the intermediate member 48 to the poles 37 of the permanent magnet serves to overcome the bias of spring 60 and holds the intermediate member 48 tight against the pole faces. At the temperatures obtained for normal operation, the member 48 is magnetizable, and, because of its proximity to the permanent magnet, itself becomes a magnet and attracts the ends 32 of the magnetizable member 30 toward it to hold the contacts 18 in electrically conducting relation with the contacts 14, thus bridging the gap between the two contacts 14, and completing a circuit between them. This circuit between the contacts 14 completes the pilot circuit of the motor starter. For loads which are considered normal, the current flow through the heater element 68 does not produce enough of a temperature rise to make the intermediate member non-magnetic. Upon the occurrence of a predetermined overload after a predetermined length of time, the heater element 68 passes enough current to become hot enough to raise the temperature of the intermediate member 48 to such a degree that it becomes sufficiently non-magnetic to be no longer able to oppose the pull of spring 60. Spring 60 thereupon pivots the bracket 50 about the shaft 22, pulls the intermediate member 48 away from the pole faces of the permanent magnet, and in so doing comes into contact with the boss 34 on the underside of transverse member 26, thus moving the contacts 18 away from the contacts 14 and breaking the circuit between the contacts 14. With the pilot circuit thus interrupted, the motor shuts down.

From the foregoing, it will be readily understood by those skilled in the art that the permanent magnet 36 and the armature 30 act together to hold the contacts 14 and 18 in engagement under a substantially constant contact pressure, and that the contacts are thus held together until they are cleanly separated by the sudden action of intermediate member 48.

Upon the occurrence of an instantaneous overload of substantial magnitude, the coil 98 makes a sufficiently strong electromagnet out of the U-shaped member 88 to overcome the pull of spring 106 and attract the armature 102 to the pole face 122 from the position of the parts shown in Fig. 4 to the position shown in Fig. 5. In moving to the position shown in Fig. 5, armature 102 engages the lower end of bridge actuator 78 and lifts it vertically, moving the upper end through the bore 80 and into contact with the bridge, again interrupting the circuit between the contacts 14. As before, with the pilot circuit broken, the motor shuts down.

If the relay is operated in a position with actuator 78 other than vertical, it may be desirable to employ a light spring (not shown) against collar 84 to insure the return of actuator 78 to its retracted position, shown in Fig. 4.

The advantages of an overload relay made according to this invention are its ease of manufacture and assembly, and the ease with which adjustments may be made in the two springs which control the amount of overload for which the relay interrupts the circuit. A further advantage lies in the fact that the relay permits small overloads of short time duration, such as would not do any injury to the motor, but serves to protect the motor against such overloads as might injure the windings.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In an overload relay, a pair of terminals, a bridge member movable into and out of contact with the terminals to make and break respectively an electric circuit between them, a member of magnetizable material mounted to be movable with the bridge member, a permanent magnet having two poles and mounted in position to attract the member of magnetizable material, a thermo-responsive magnetizable member between the permanent magnet and the member of magnetizable material, said thermo-responsive member being of a material which becomes non-magnetic at elevated temperatures, and resilient means movable to mount said thermo-responsive member to effect movement of the bridge member out of engagement with said pair of terminals.

2. The relay of claim 1, in which the thermo-responsive magnetizable member is in contact with the poles of the permanent magnet.

3. In the relay of claim 1, a heater element located in the vicinity of the thermo-responsive magnetizable member, the heater being responsive to the flow of excessive current in a protected circuit.

4. In an overload relay, a pair of terminals, a bridge member movable into and out of contact with the terminals to make and break respectively an electric circuit between them, spring means arranged to move the bridge member into circuit breaking position, a member of magnetizable material mounted to be movable with the bridge member, a permanent magnet having two poles and mounted in position to attract the member of magnetizable material, a thermo-responsive magnetizable member between the permanent magnet and the member of magnetizable material, said thermo-responsive member being of a material which becomes non-magnetic at elevated temperatures and is adapted thereupon to cause movement of the bridge member, a bridge actuator movable to move the bridge into circuit breaking position, and electromagnetic means arranged to move the bridge actuator to break the circuit, the electromagnetic means being responsive to the flow of excessive current in a protected circuit.

5. In the relay of claim 4, a heater element located in the vicinity of the thermo-responsive magnetizable member, the heater being responsive to the flow of excessive current in the protected circuit.

6. The relay of claim 5, in which the thermo-responsive magnetizable member is normally in contact with the poles of the permanent magnet.

7. The relay of claim 4, in which the electromagnetic means comprises a U-shaped member, a coil disposed around one leg of the U, an armature pivoted about a point adjacent one leg of the U, and spring means biasing the armature away from the other leg of the U, the armature being positioned and arranged to move the bridge actuator against the bridge to break the circuit.

8. In electrical apparatus, a pair of terminals, a bridge member, mounting means for the bridge member making the bridge member movable into and out of contact with the terminals to make and break respectively an electric circuit between the terminals, magnetic means including a permanent magnet to hold the bridge member in circuit making position, intermediate means between the permanent magnet and the mounting means and movable alternatively toward the permanent magnet and toward the mounting means and being spring biased toward the mounting means to break the circuit, the intermediate means being magnetizable at room temperatures and substantially non-magnetic at temperatures above 500° F., and an electric heater element in the vicinity of the intermediate means and being arranged in series with an electric circuit to be protected against overload.

9. In the apparatus of claim 8, means independent of the intermediate means to move the bridge member out of contact with the terminals, and electromagnetic means to actuate the independent means, the electromagnetic means being arranged in series with the circuit to be protected.

10. The apparatus of claim 9, in which the electromagnetic means comprises a U-shaped member, an electrical coil in series with the circuit to be protected and positioned about one leg of the U, an armature pivoted about one leg of the U and being movable to engage the independent means, and spring means biasing the armature away from engagement with the independent means.

11. In the apparatus of claim 8, means independent of the intermediate means to move the bridge member out of contact with the terminals, a U-shaped member, an electrical coil in series with the circuit to be protected and positioned about one leg of the U, an armature pivoted about a knife edge disposed on one leg of the U and being movable to engage the independent means, and spring means biasing the armature away from engagement with the independent means.

12. In electrical apparatus, a pair of contacts, a bridge member movable into and out of engagement with the contacts to make and break respectively a circuit therebetween, magnetic means including two relatively movable members normally attracted to each other to maintain a substantially constant contact pressure between the bridge member and said contacts so long as the circuit between the contacts remains closed by the bridge member, a magnetizable member biased to move the bridge member out of engagement with the contacts and mounted to be held against such movement by one member of the magnetic means, the magnetizable member being of a material which becomes non-magnetic at elevated temperatures, and a heater adapted under predetermined circumstances to raise the temperature of the magnetizable member to such a value that said member becomes non-magnetic.

13. In a relay, a pair of contacts in the control circuit of an electric machine which is to be controlled, a bridge member having bridging contacts which are movable into and out of engagement with said pair of contacts to close and open respectively the control circuit, magnetic means including two relatively movable members normally attracted to each other to hold the bridge member in position to keep the control circuit closed and maintaining a substantially constant contact pressure between said pair of contacts and the bridging contacts, a magnetizable member biased to move the bridging contacts out of engagement with the pair of contacts and mounted to be held against such movement by one member of the magnetic means, the magnetizable member being non-magnetic at elevated temperatures, and a heater adapted under predetermined load conditions of said machine to raise the temperature of the magnetizable member to render it non-magnetic.

14. In an overload relay, a pair of terminals adapted to be connected in the pilot circuit of an electric motor, a bridge member movable into and out of engagement with the terminals to make and break respectively a circuit between them, a second pair of terminals adapted to be connected in the circuit of a motor armature, an electric heater connected to the second pair of terminals, bridge actuating means responsive to a temperature rise in the electric heater to engage and move the bridge member into circuit breaking position, the last-named means including a permanent magnet and a movable member which is magnetizable at room temperatures but loses its magnetism at elevated temperatures, electromagnetic means having electrical connections with the second pair of terminals, and means responsive to the electromagnetic means to move the bridge member into circuit breaking position.

JOHN D. RUSSELL.

(References on following page)

REFERENCES CITED

The following references are of record in the file of this patent:

UNITED STATES PATENTS

| Number | Name | Date |
|---|---|---|
| 692,217 | Sundh | Jan. 28, 1902 |
| 822,323 | Thomson | June 5, 1906 |
| 1,328,477 | Baker | Jan. 20, 1920 |
| 1,530,929 | Brobst | Mar. 24, 1925 |
| 1,655,852 | Adams | Jan. 10, 1928 |
| 1,701,357 | Butler | Feb. 5, 1929 |
| 1,736,989 | White | Nov. 26, 1929 |
| 1,802,679 | Speiser | Apr. 28, 1931 |
| 1,947,641 | Broekhuysen | Feb. 20, 1934 |
| 2,092,478 | Sommermeyer | Sept. 7, 1937 |
| 2,296,969 | Wittmann | Sept. 29, 1942 |
| 2,302,250 | Penn | Nov. 17, 1942 |
| 2,322,069 | Stimson | June 15, 1943 |
| 2,356,836 | Ebert | Aug. 29, 1944 |
| 2,422,764 | Wood | June 24, 1947 |

FOREIGN PATENTS

| Number | Country | Date |
|---|---|---|
| 229,564 | Great Britain | Feb. 26, 1925 |
| 256,609 | Great Britain | July 30, 1926 |